US011102625B2

United States Patent
Kim

(10) Patent No.: US 11,102,625 B2
(45) Date of Patent: Aug. 24, 2021

(54) METHOD FOR SUPPORTING SMS TRANSMISSION FOR USER EQUIPMENT THAT CAN RECEIVE SERVICE FROM 3GPP 5G SYSTEM AND FROM EPS IN WIRELESS COMMUNICATION SYSTEM, AND APPARATUS THEREFOR

(71) Applicant: LG Electronics Inc., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/633,964

(22) PCT Filed: Jul. 20, 2018

(86) PCT No.: PCT/KR2018/008240
§ 371 (c)(1),
(2) Date: Jan. 24, 2020

(87) PCT Pub. No.: WO2019/022442
PCT Pub. Date: Jan. 31, 2019

(65) Prior Publication Data
US 2020/0213819 A1  Jul. 2, 2020

Related U.S. Application Data

(60) Provisional application No. 62/537,421, filed on Jul. 26, 2017.

(51) Int. Cl.
*H04W 4/14* (2009.01)
*H04W 76/27* (2018.01)
(Continued)

(52) U.S. Cl.
CPC .............. *H04W 4/14* (2013.01); *H04W 8/04* (2013.01); *H04W 8/08* (2013.01); *H04W 8/183* (2013.01);
(Continued)

(58) Field of Classification Search
CPC .......... H04W 4/14; H04W 8/04; H04W 8/08; H04W 8/183; H04W 48/16; H04W 60/00; H04W 88/18
See application file for complete search history.

(56) References Cited

U.S. PATENT DOCUMENTS

2019/0380011 A1*  12/2019  Wong ................... H04W 8/28
2020/0245222 A1*   7/2020  Abraham ............ H04W 40/02

FOREIGN PATENT DOCUMENTS

WO     WO2017062244     4/2017

OTHER PUBLICATIONS

3rd Generation Partnership Project; Technical Specification Group Services and System Aspects; "System Architecture for the 5G System; Stage 2 (Release 15)," 3GPP TS 23.501 V1.1.0, dated Jul. 2017, 166 pages.

(Continued)

*Primary Examiner* — Wayne H Cai
(74) *Attorney, Agent, or Firm* — Fish & Richardson P.C.

(57) ABSTRACT

An embodiment of the present invention pertains to a method for a home subscriber server (HSS)+user data management (UDM) supporting a mobile terminated (MT) short message (SM) service for a UE that is registered to both of an evolved packet core (EPC) and a 5G core network (5GC) in a wireless communication system, the method comprising the steps of: the HSS+UDM receiving information for MT SM routing from an access and mobility management function (AMF) and a mobility management entity (MME); determining a priority regarding which one of an SMSF connected to the AMF and the MME an MT SM would be transmitted to first, based on the information; and transmitting routing information including the determined priority to an SMS-related node, wherein the HSS+UDM may deter- (Continued)

mine the priority according to whether a UE to receive the MT SM is in a state of being connected to 5GC or EPC.

13 Claims, 13 Drawing Sheets

(51) Int. Cl.
 *H04W 8/04* (2009.01)
 *H04W 8/08* (2009.01)
 *H04W 8/18* (2009.01)
 *H04W 48/16* (2009.01)
 *H04W 60/00* (2009.01)
 *H04W 88/18* (2009.01)
(52) U.S. Cl.
 CPC ........... *H04W 48/16* (2013.01); *H04W 60/00* (2013.01); *H04W 76/27* (2018.02); *H04W 88/18* (2013.01)

(56) References Cited

OTHER PUBLICATIONS

3rd Generation Partnership Project; Technical Specification Group Services and System Aspects; "Procedures for the 5G System; Stage 2 (Release 15)," 3GPP TS 23.502 V0.5.0, dated Jul. 2017, 154 pages.
3rd Generation Partnership Project; Technical Specification Group Services and System Aspects; "Circuit Switched (CS) fallback in Evolved Packet System (EPS); Stage 2 (Release 14)," 3GPP TS 23.272 V14.0.0, dated Mar. 2017, 104 pages.
China Mobile, "Updating SMS over NAS MT procedures with NF service operation invocations," S2-174213, SA WG2 Meeting#122, San Jose Del Cabo, Mexico, dated Jun. 26-30, 2017, 3 pages.
PCT International Search Report in International Application No. PCT/KR2018/008240, dated Jan. 24, 2019, 20 pages (with English translation).

* cited by examiner (a)

(b)

METHOD FOR SUPPORTING SMS TRANSMISSION FOR USER EQUIPMENT THAT CAN RECEIVE SERVICE FROM 3GPP 5G SYSTEM AND FROM EPS IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2018/008240, filed on Jul. 20, 2018, which claims the benefit of U.S. Provisional Application No. 62/537,421, filed on Jul. 26, 2017. The disclosures of the prior applications are incorporated by reference in their entirety.

TECHNICAL FIELD

The present disclosure relates to a wireless communication system, and more particularly, to a method and apparatus for efficiently providing a short message service (SMS) to a user equipment (UE) capable of being served by a 3rd generation partnership project (3GPP) fifth-generation (5G) system and an evolved packet system (EPS).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The object of the present disclosure is to provide a method for a home subscriber server+user data management (HSS+UDM) to support a mobile terminated (MT) short message (SM) service for a UE registered in both an evolved packet core (EPC) and a 5G core network (5GC).

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In an aspect of the present disclosure, provided herein is a method of supporting, by an HSS+UDM, an MT SM service for a UE registered in both an EPC and a 5GC in a wireless communication system. The method may include: receiving, by the HSS+UDM, information for MT SM routing from an access and mobility management function (AMF) and a mobility management entity (MME); determining priorities on whether to transmit an MT SM first to a short message service function (SMSF) connected to the AMF or the MME based on the information; and transmitting routing information including the determined priorities to a short message service related (SMS-related) node. The HSS+UDM may determine the priorities depending on whether the UE receiving the MT SM is connected to the 5GC or the EPC.

In another aspect of the present disclosure, provided herein is an HSS+UDM device for supporting an MT SM service for a UE registered in both an EPC and a 5GC in a wireless communication system. The HSS+UDM device may include a transceiver and a processor. The processor may be configured to: control the HSS+UDM device to receive information for MT SM routing from an AMF and an MME; determine priorities on whether to transmit an MT SM first to an SMSF connected to the AMF or the MME based on the information; and transmit routing information including the determined priorities to an SMS-related node. The HSS+UDM device may determine the priorities depending on whether the UE receiving the MT SM is connected to the 5GC or the EPC.

When the UE is connected to either the 5GC or the EPC, the HSS+UDM may assign a higher priority to a serving node in the connected core network.

When the UE is connected to both the 5GC and the EPC, the HSS+UDM may assign the same priority to the SMSF and the MME.

When the SMSF and the MME have the same priority, the determination of whether the MT SM is routed to the SMSF or the MME may be left to an SMS gateway mobile switching center (SMS-GMSC).

When the UE is connected to neither the 5GC nor the EPC, the HSS+UDM may determine the priorities by comparing the most recent time at which the UE moves a packet data network (PDN) connection to the 5GC and the most recent time at which the UE moves a protocol data unit (PDU) session from the 5GC to the EPC.

When the most recent time at which the UE moves the PDU session from the 5GC to the EPC is later than the most recent time at which the UE moves the PDN connection from the EPC to the 5GC, the HSS+UDM may assign a higher priority to the MME.

The information for the MT SM routing received from the AMF may include at least one of the following information: whether the UE is in a connection management connected (CM-CONNECTED) state; the most recent time at which the UE performs a registration; the most recent time at which the UE enters a CM-IDLE state; or the most recent time at which the UE moves the PDN connection from the EPC to the 5GC.

The information for the MT SM routing received from the MME may include at least one of the following information: whether the UE is in an EPS connection management connected (ECM-CONNECTED) state; the most recent time at which the UE performs an Attach procedure or a tracking area update (TAU) procedure; the most recent time at which the UE enters an ECM-IDLE state; or the most recent time at which the UE moves the PDU session from the 5GC to the EPC.

Each of the SMSF connected to the AMF and the MME may correspond to a serving node supporting the SMS for the UE.

The SMS-related node may be one of an SMS-GMSC, an SMS router, an Internet protocol short message gateway (IP-SM-GW), and an SMS gateway (SMS-GW).

When the most recent time at which the UE performs the Attach procedure or the TAU procedure is later than the most recent time at which the UE performs a 5GC registration, the MME may be determined to have a higher priority.

When the most recent time at which the UE enters the ECM-IDLE state is later than the most recent time at which the UE enters the CM-IDLE state, the MME may be determined to have a higher priority.

Advantageous Effects

According to the present disclosure, when a UE is registered in both an EPC and a 5GC, a network where the UE is more likely to exist may be selected as a network for SMS routing, thereby reducing unnecessary signaling, resource waste, etc.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
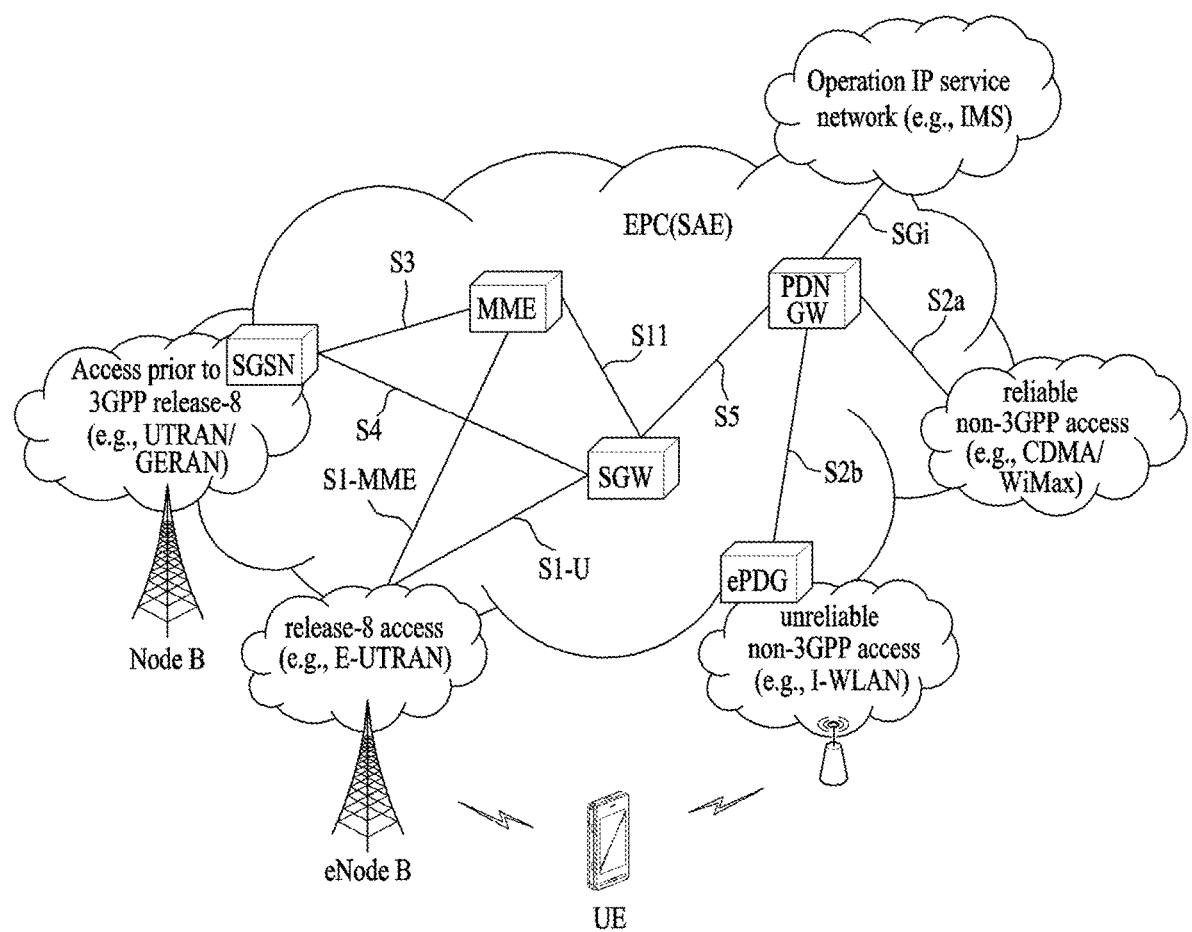
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

eRelay-UE: a Layer 2 relay in which a UE supports Indirect 3GPP Communication between an eRemote-UE and the 3GPP network, using E-UTRA, WLAN or Bluetooth between the eRemote-UE and the relay. In the present disclosure, the eRelay-UE may be referred to as 'ProSe UE-to-Network Relay', 'UE-to-Network Relay', 'Relay', 'Relay UE', 'eRelay', 'Evolved ProSe UE-to-Network Relay', etc.

eRemote-UE: a UE that is connected to a network using an Indirect 3GPP Communication. In the present disclosure, the eRemote-UE may be referred to 'ProSe Remote UE', 'Remote UE', 'Remote', 'eRemote', 'Evolved ProSe Remote UE', etc.

Model A discovery: involves one UE announcing 'I am here'. This model defines two roles for ProSe-enabled UEs participating in ProSe direct discovery. The first role is an announcing UE that announces information to be used by UEs in proximity that have permission to discover. The second role is a monitoring UE that has an interest in information in proximity of an announcing UE.

Model B discovery: involves one UE asking 'who is there' and/or 'are you there'. This model defines two roles for ProSe-enabled UEs participating in ProSe direct discovery. The first role is a discoverer UE that transmits a request containing information about things the UE is interested in for discovery. The second role is a discoveree UE that receives a request message in response to information related to a discoverer's request.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Appendix A is a list of the reference points shown in FIG. 1. Various reference points may be present in addition to the reference points in Appendix A according to network structures.

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
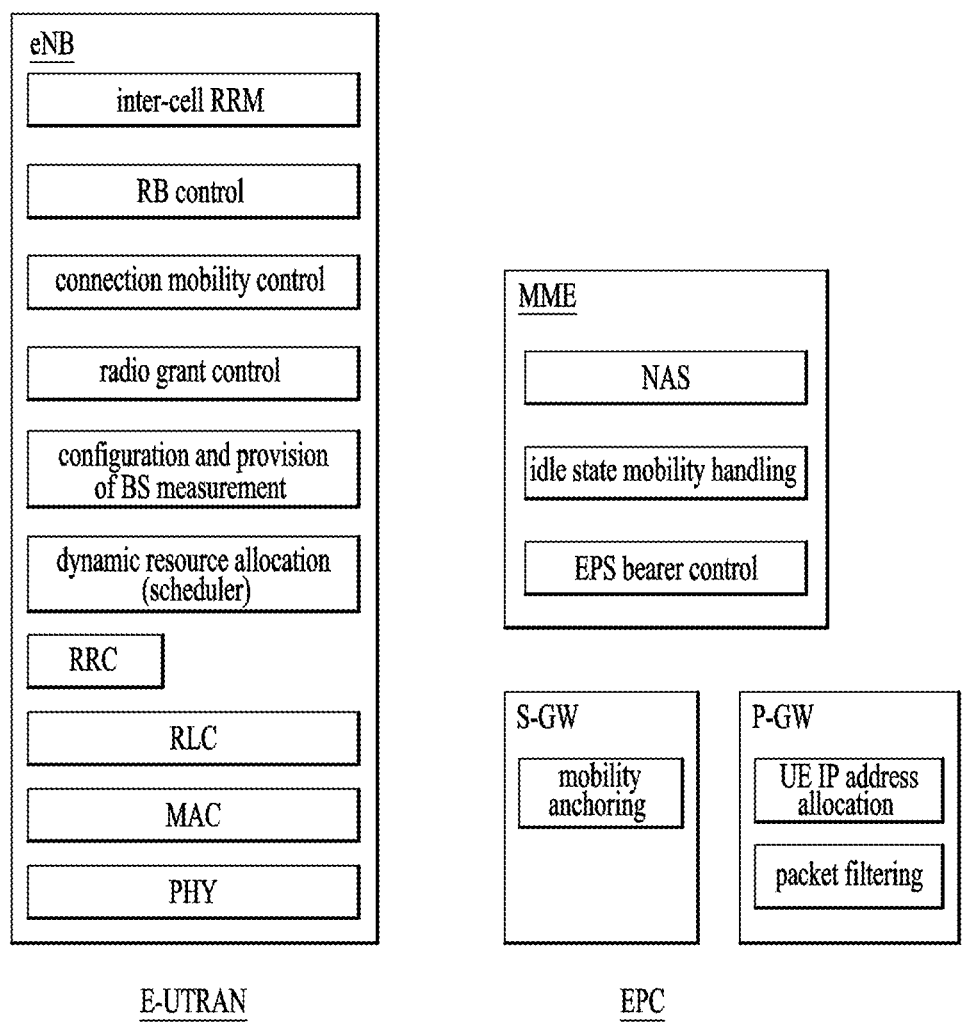
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
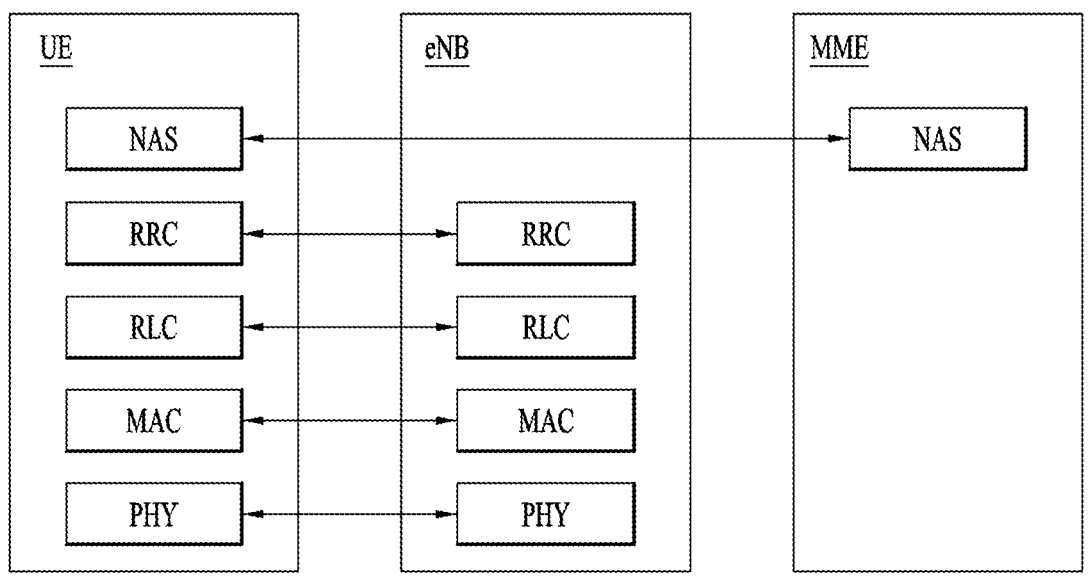
FIG. 3 is a diagram illustrating the structure of a radio interface protocol in a control plane.
Figure 4:
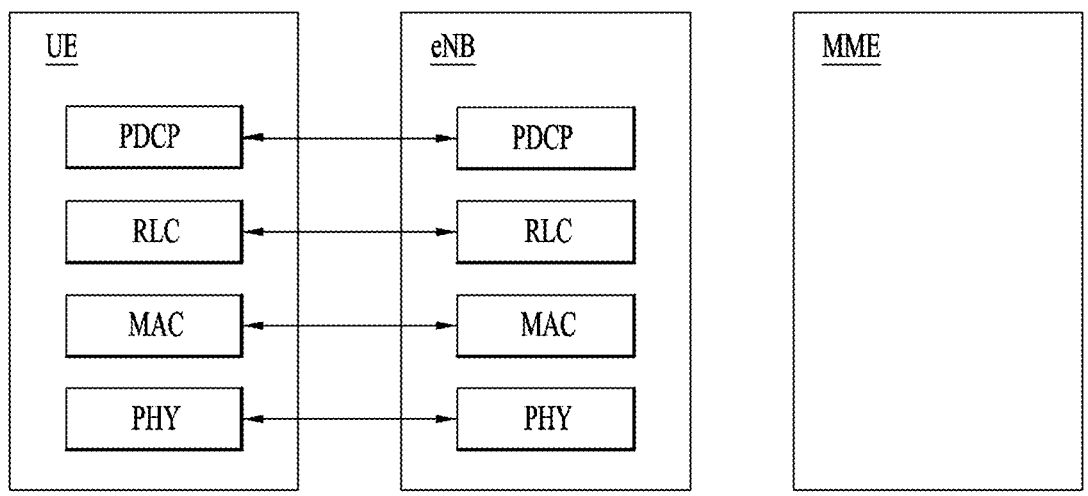
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC CONNECTED state. The RRC state of the UE which does not have logical connection with the RRC of the E-UTRAN is referred to as an RRC_IDLE state. A UE in the RRC CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
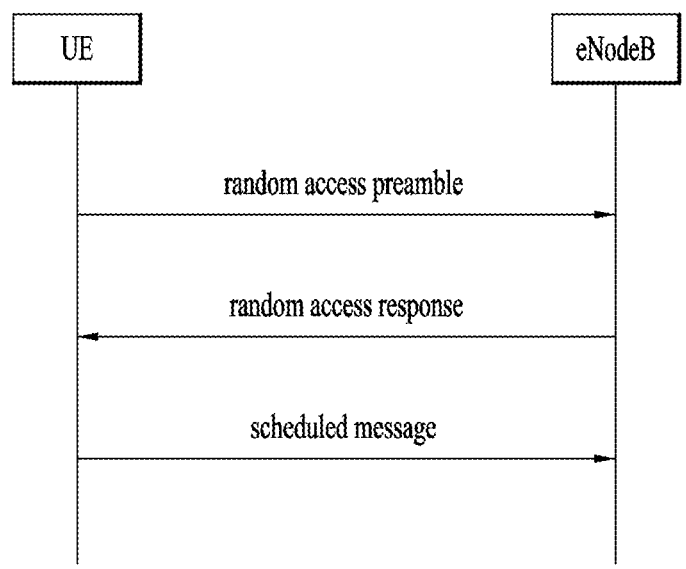
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
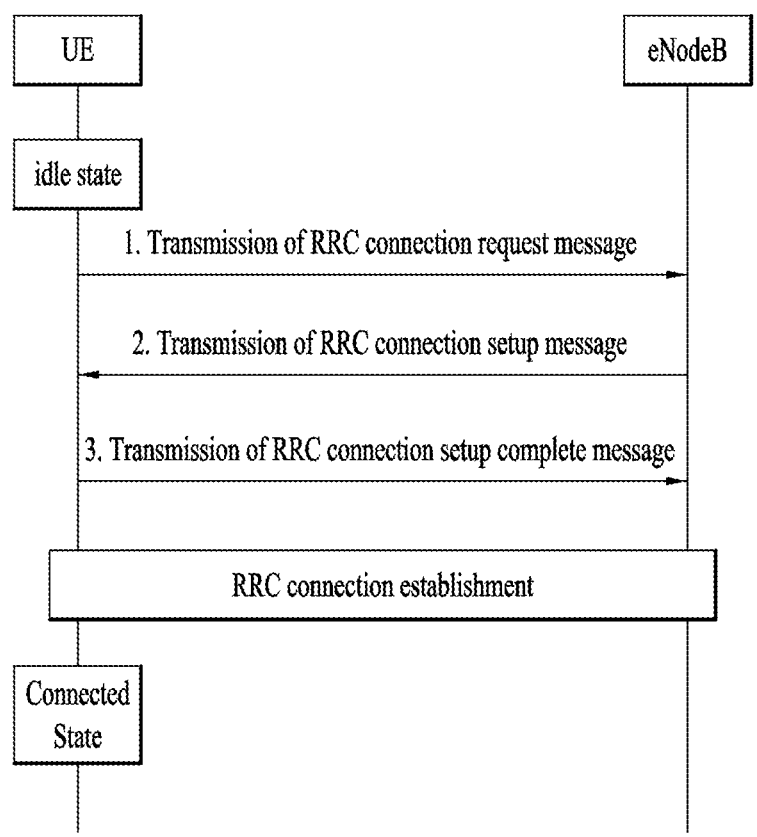
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
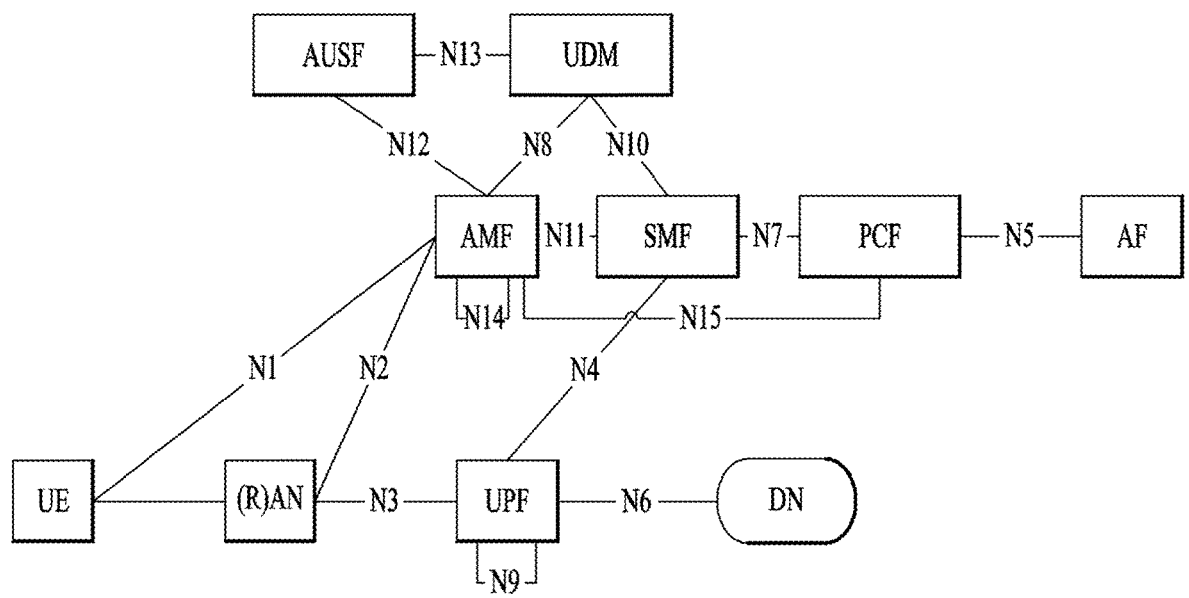
FIG. 7 is a diagram illustrating a 5th generation (5G) system.

In a next generation system (i.e., 5G core network (CN)), the functionality of an MME in the legacy EPC may be divided into a Core Access and Mobility Management Function (AMF) and a Session Management Function (SMF). The AMF is in charge of NAS interaction with the UE and mobility management (MM), and the SMF is in charge of session management (SM). In addition, the SMF manages a user plane function (UPF), which corresponds to a gateway for routing user traffic, i.e., managing a user plane. This may be interpreted to mean that the SMF manages the control plane of an S-GW and a P-GW in the legacy EPC and the UPF manages the user plane thereof. For user traffic routing, at least one UPF may exist between a RAN and a data network (DN). In other words, the legacy EPC may be implemented in the 5G system as illustrated in FIG. 7. The 5G system defines a protocol data unit (PDU) session as a concept related to a PDN connection in the legacy EPS. The PDU session refers to association between the UE and the DN that provides PDU connectivity services and may be divided into a PDU session of IP type, a PDU session of Ethernet type, and a PDU session of unstructured type. Unified data management (UDM) serves as an HSS of the EPC, and a policy control function (PCF) serves as a PCRF of the EPC. To satisfy the requirements of the 5G system, these functions may be extended and provided. Details of the 5G system architecture, individual functions, and individual interfaces may be found in TS 23.501.

Details of the 5G system are found in TS 23.501 and TS 23.502. In particular, the 5G system (next generation system) needs to support interworking with the legacy system, EPS. The interworking is necessary for the following reasons: when a new mobile communication system is to be installed, it is difficult for a service provider to provide services all over the area at the beginning, and thus, a UE needs to be served by the legacy mobile communication system when out of coverage of the new mobile communication system. Alternatively, the network may be configured such that some services (e.g., data services) are provided by the new mobile communication system and other services (e.g., voice services) are provided by the legacy mobile communication system.

Figure 8:
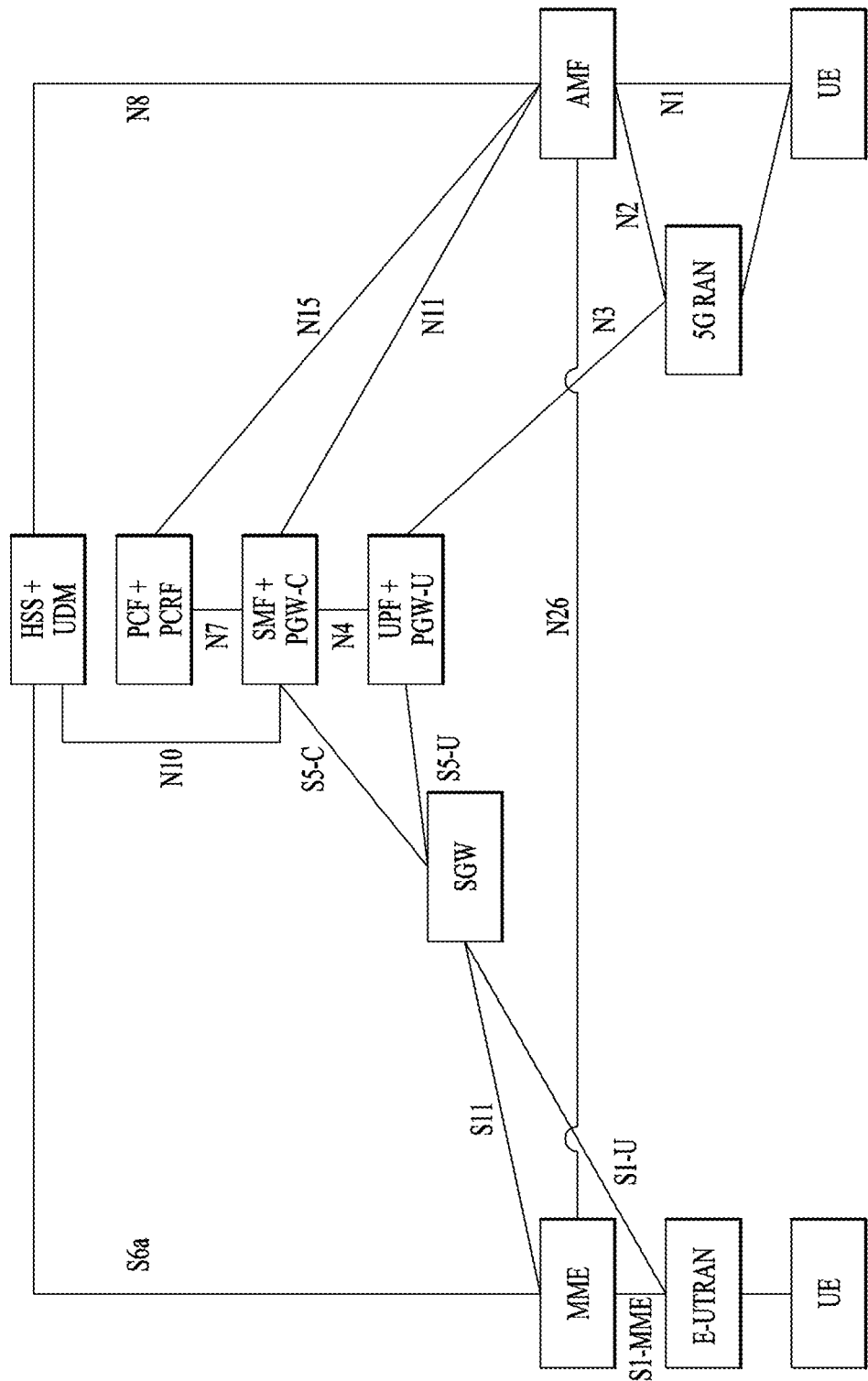
FIG. 8 is a diagram illustrating an architecture for interworking between the 5G system and the EPS.

The architecture for interworking between the 5G system and the EPS is described in section 4.3 of TS 23.501 v1.1.0. FIG. 8 illustrates the architecture for interworking between the 5G system and the EPS when the UE is not roaming. FIG. 8 shows an interface between an MME and an AMF, i.e., an N26 interface between core networks. The interface may or may not be supported depending on service provider's choices.

Interworking between the 5G system (5GS) and the EPS when the N26 interface is supported or not is described in section 5.17.2 of TS 23.501 v1.1.0. Specifically, how the UE changes its serving system from the 5GS (or 5G core (5GC)) to the EPS (or EPC) and vice versa to receive services is described therein. Herein, the term "5GS" may be interchangeably used with the term "5GC", and the term "EPS" may be interchangeably used with the term "EPC". In particular, in the case of a UE capable of supporting both 5GC NAS and EPC NAS (i.e., a UE with capability of connecting to both the 5GS and the EPS), the UE may operate in single-registration mode or dual-registration mode. Appendix B is extracted from TS 23.501 v1.1.0 and shows how to support a UE operating in the dual-registration mode when the N26 interface is not supported.

The 5GS needs to support a short message service (SMS). SMS over NAS is a scheme of transmitting an SMS in a control plane. In contrast to the SMS over NAS, SMS over IMS is a scheme of transmitting an SMS in a user plane.

Figure 9:
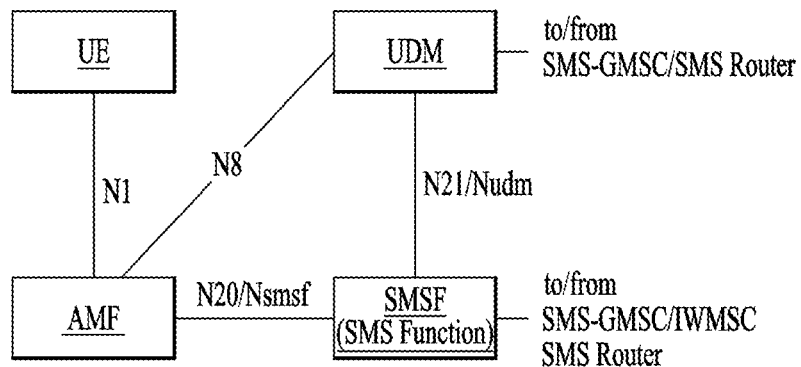
FIG. 9 illustrates SMS over NAS in a 5GC.

FIG. 9 illustrates the SMS over NAS in the 5GC. Details thereof are found in section 4.4.2 (SMS over NAS) of TS 23.501 v1.1.0 and section 4.13.3 (SMS over NAS procedure) of TS 23.502 v0.5.0.

Appendix C is extracted from TS 23.502 and shows a procedure in which when a UE is registered in the 5GC, if an AMF serving the UE registers to UDM that it is a mobility management (MM) serving node for the UE and selects a short message service function (SMSF) to support SMS transmission for the UE, the SMSF registers to the UDM that it is an SMS serving node for the UE and an operation for releasing the registration.

Appendices D to F show a procedure for transmitting a mobile terminated (MT) SMS over a 3GPP access or a non-3GPP access (extracted from TS 23.502).

Figure 10:
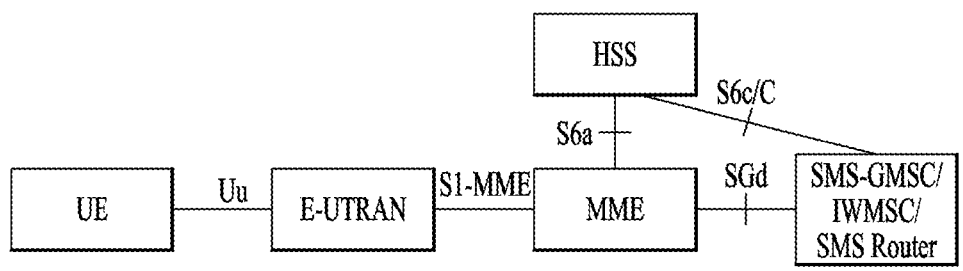
FIG. 10 illustrates SMS over NAS including an MME.
Figure 10:
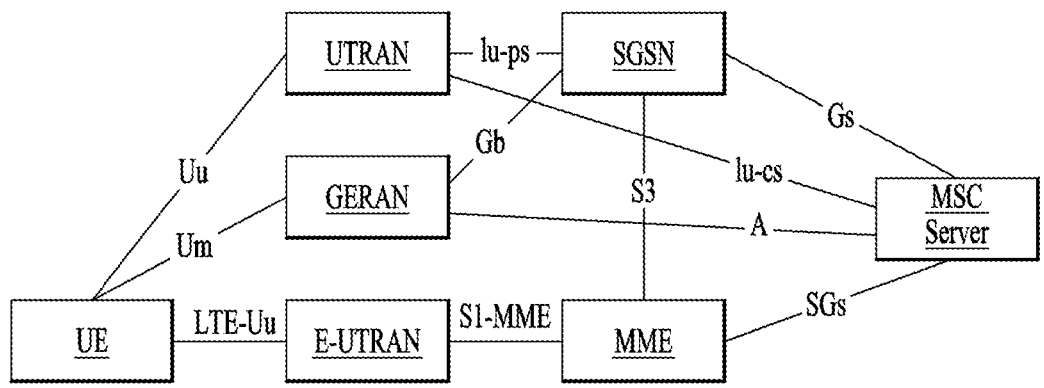

The SMS over NAS in the EPC may be divided into two cases: when the MME supports the SMS function and when the MME does not support the SMS function. When the MME supports the SMS function, the MME supports an SMS protocol stack. In this case, the SMS is transmitted based on the architecture shown in FIG. 10(a). Details thereof may be found in Annex C (normative): SMS in MME in TS 23.272.

When the MME does not support the SMS function, the MME has no SMS protocol stack. In this case, the SMS is transmitted based on the architecture shown in FIG. 10(b). This is called SMS over SGs. Details thereof may be found in TS 23.272.

Appendices G to I are extracted from TS 23.272 and show a procedure in which when a UE is registered in the EPC, if an MME serving the UE supports the SMS function, the MME registers to an HSS that it is a serving node for the UE and a procedure for releasing the registration.

As described above, when an MT SMS toward a UE arrives at a SMS service center (SC), the MT SMS is forwarded to an SMS gateway mobile switching center (SMS-GMSC). Thereafter, the SMS-GMSC asks an HSS/UDM about which node to transmit the MT SMS to, that is, the SMS-GMSC requests routing information. The HSS/UDM checks which serving node is capable of supporting the SMS for the UE and then provides related information to the SMS-GMSC.

If the UE is registered only in the EPC and an MME registers to the HSS that it supports the SMS function for the UE, the HSS may provide information on the corresponding MME to the SMS-GMSC. Then, the SMS-GMSC may send the MT SMS to the MME and request the MME to transmit the MT SMS to the UE. If the UE is registered only in the 5GC, the UDM may provide information on an SMSF to the SMS-GMSC, and the SMS-GMSC may send the MT SMS to the SMSF and request the SMSF to transmit the MT SMS to the UE.

However, if the UE is registered in both the EPC and 5GC, that is, if the UE operates in the dual-registration mode and is registered in both the two core networks, both the MME and SMSF may be registered as a serving node capable of supporting the SMS in the HSS+UDM (i.e., subscriber information data base (DB) shared or accessed by the two core networks (CNs). In this case, it may be unclear which CN or which serving node the MT SMS is delivered. In section 5.17.2.3.3 (Mobility for UEs in dual-registration mode) of TS 23.501 v1.3.0, it is defined that which network a control plane request is transmitted first to may depend on the network configuration. (When sending a control plane request for MT services (e.g. MT SMS), the network routes it via either the EPC or the 5GC. In absence of UE response, the network should attempt routing the control plane request via the other system. NOTE 5: The choice of the system through which the network attempts to deliver the control plane request first is left to network configuration.) However, when the determination is left to the network's selection, it may cause unnecessary signaling repetition, resource waste, etc., compared to when the request is delivered to a network with higher capability.

Embodiment 1

Hereinafter, a description will be given of a method of supporting an MT SMS (or SM service) for a UE registered in both the EPC and the 5GC according to an embodiment of the present disclosure. In particular, Embodiment 1 relates to a case in which the UE is registered in the 5GS over either or both a 3GPP access and a non-3GPP access, and more particularly, when the two accesses are used, the two accesses belong to the same PLMN. Although the present disclosure is focused on the HSS+UDM, it may be interpreted from the perspective of other network nodes. For example, when it is said that the HSS+UDM receives a signal from the SC, it may be interpreted to mean that the SC transmits the signal to the HSS+UDM.

An HSS+UDM may receive information for MT SM routing from an AMF and an MME and then determine priorities on whether to transmit an MT SM first to an SMSF connected to the AMF or the MME based on the information. Then, the HSS+UDM may transmit routing information including the determined priorities to an SMS-related node.

In the prior art, it is unclear which CN or which serving node the MT SMS is transmitted first to. However, when the HSS+UDM determines and signals the priority, such a problem may be solved. Regarding the priority determination, the HSS+UDM may determine the priority depending on whether the UE intending to receive the MT SM is connected to the 5GC or EPC.

As a first case, when the UE is connected to either the 5GC or EPC, the HSS+UDM may give a higher priority to a serving node in the connected CN. That is, when the UE is connected to either the 5GC or EPC, the serving node in the connected CN may be prioritized. For example, when the UE is connected only to the 5GC, the SMSF may be prioritized over the MME.

As a second case, when the UE is connected to both the 5GC and EPC, the HSS+UDM may give the same priority to the SMSF and MME. When the SMSF and MME have the same priority, the priority may be determined by an SMS-GMSC. Specifically, when the UE is connected to both the 5GC and EPC, the HSS+UDM may give the same priority or may not provide information on the priority (in this case, the SMS-GMSC determines whether to transmit the MT SMS first to the SMSF or MME). However, in this case, the HSS+UDM may give the higher priority to one serving node based on at least one of information ii), iii), and iv) provided by the AMF (i.e., information transmitted from the AMF in response to an information request for the MT SM routing) (if provided), information II), III), and IV) provided by the MME (i.e., information transmitted from the MME in response to the information request for the MT SM routing) (if provided), and local policies/configurations. Further, the HSS+UDM may give the higher priority to the SMSF at all times and vice versa.

As a third case, when the UE is not connected to both the 5GC and EPC, the HSS+UDM may give the higher priority to one serving node of the MME and SMSF based on the at least one of information ii), iii), and iv) provided by the AMF (i.e., information transmitted from the AMF in response to the information request for the MT SM routing), information II), III), and IV) provided by the MME (i.e., information transmitted from the MME in response to the information request for the MT SM routing), and the local policies/configurations.

For example, when the UE is not connected to both the 5GC and EPC, the HSS+UDM may determine the priority by comparing the most recent time at which the UE moves a PDN connection to the 5GC and the most recent time at which the UE moves a PDU session from the 5GC to the EPC. If the most recent time at which the UE moves the PDN connection to the 5GC is later than the most recent time at which the UE moves the PDU session from the 5GC to the EPC, the HSS+UDM may give the higher priority to the MME. In other words, when the most recent (or last) time at which the UE moves the PDU session from the 5GC to the EPC is later (more recent) than the most recent (or last) time at which the UE moves the PDN connection from the EPC to the 5GC, the higher priority may be given to the MME (it is based on the assumption that when a UE is discovered by paging, the UE is more likely to receive a response from the EPC than from the 5GC). Alternatively, the HSS+UDM may give the higher priority to the SMSF at all times and vice versa.

Alternatively, when the most recent time at which the UE performs an Attach procedure or a tracking area update (TAU) procedure is later than the most recent time at which the UE performs a 5GC registration, the higher priority may be given to the MME. Alternatively, when the most recent time at which the UE enters the EPS connection management-IDLE (ECM-IDLE) state is later than the most recent time at which the UE enters the connection management-IDLE (CM-IDLE) state, the higher priority may be given to the MME.

When the priority is determined as described above, the MT SM may be transmitted to a network where the UE is more likely to receive a response.

Meanwhile, when the UE is not connected to both the 5GC and EPC (or when the UE is in the IDLE state), the HSS+UDM may give the same priority or may not provide the priority information (in this case, the SMS-GMSC determines to transmit the MT SMS first to which one of the SMSF and MME).

The information for the MT SM routing received from the AMF may include at least one of the following information: whether the UE is in the CM-CONNECTED state; the most recent time at which the UE performs a registration; the most recent time at which the UE enters the CM-IDLE state; and the most recent time at which the UE moves the PDN connection from the EPC to the 5GC. Specifically, the AMF may provide a response containing at least one of information i) to iv) (e.g., a response for the MT SM routing) to the HSS+UDM. Hereinafter, information i) to iv) will be described in detail.

i) Whether the UE is in the CM-CONNECTED state: The CM-CONNECTED state of the UE may mean that the UE is reachable or available. Accordingly, information on whether the UE is reachable or available may be provided instead of or in addition to information on whether the UE is in the CM-CONNECTED state. Additionally, access information indicating the UE's CM-CONNECTED state for each access (e.g., 3GPP access, non-3GPP access, etc.) may be included. Alternatively, instead of providing the CM-CONNECTED state for each access, it may be informed that the UE is in the CM-CONNECTED state if the UE is in the CM-CONNECTED state for at least one access (this may be interpreted to mean that the UE is in the CM-CONNECTED state in the 5GC).

ii) The most recent (or last) time at which the UE performs the registration: The registration may include all types of registration procedures (e.g., initial, periodic, mobility, handover, etc.). Additionally, information on which access the UE performs the registration over may be included. Alternatively, instead of providing the information for each access, the most recent (or last) time at which the UE performs the registration over all accesses may be provided (this may be interpreted as the time at which the UE performs the registration in the 5GC last).

iii) The most recent (or last) time at which the UE switches from the CM-CONNECTED state to the CM-IDLE state: This may be interpreted to as the time at which the UE was most recently in the CM-CONNECTED state. Additionally, information on which access the UE switches to the CM-IDLE state over may be included. Alternatively, instead of providing the information for each access, the most recent (or last) time at which the UE enters the CM-IDLE state over all accesses (this may be interpreted as the time at which the UE enters the CM-IDLE state last in the 5GC).

iv) The most recent (or last) time at which the UE moves the PDN connection from the EPC to the 5GC: Moving the PDN connection from the EPC to the 5GC may mean using the PDN connection, which was created in the EPC, as the PDU session in the 5GC. In addition, it may be interpreted to mean that the PDN connection/PDU session has the same access point name/data network name (APN/DNN). Additionally, information on which access the UE moves the PDN connection over may be included. Alternatively, instead of providing the information for each access, the most recent (or last) time at which the UE moves the PDN connection over all accesses may be provided (this is may be interpreted as the time at which the UE moves the PDN connection from the EPC to the 5GC last). The switching between the PDU connection and the PDU session may be interpreted as a handover operation.

Information ii), iii), and iv) may be provided only when the UE is not in the CM-CONNECTED state for a specific access (or when the UE is in the CM-IDLE state for the specific access). Alternatively, information ii), iii), and iv) may be always provided regardless of the CM state. In addition to information i) to iv), various information including the following information may also be provided. For example, when the UE is in the CM-CONNECTED state for the 3GPP access and in the CM-IDLE state for the non-3GPP access, the AMF may provide the HSS+UDM with at least one of the following information: information indicating that the UE is in the CM-CONNECTED state for the 3GPP access; information indicating that the UE is not in the CM-CONNECTED state for the non-3GPP access (or the UE is in the CM-IDLE state for the non-3GPP access) (however, it may be indicated by not providing the information explicitly. In other words, by not providing the information explicitly, it may be indicated that the UE is not in the CM-CONNECTED state for the non-3GPP access.); information indicating the most recent (or last) time at which the UE performs a registration over the non-3GPP access; and information indicating the most recent (or last) time at which the UE switches from the CM-CONNECTED state to the CM-IDLE state over the non-3GPP access.

The information for the MT SM routing received from the MME may include at least one of the following information: whether the UE is in the ECM-CONNECTED state; the most recent time at which the UE performs the Attach or TAU procedure; the most recent time at which the UE enters the ECM-IDLE state; and the most recent time at which the UE changes the PDU session. Specifically, the MME may provide a response containing at least one of information I) to IV) (e.g., a response for the MT SM routing) to the HSS+UDM. Hereinafter, information I) to IV) will be described in detail.

I) Whether the UE is in the ECM-CONNECTED state: The ECM-CONNECTED state of the UE may mean that the UE is reachable or available. Accordingly, information on whether the UE is reachable or available may be provided instead of or in addition to information on whether the UE is in the ECM-CONNECTED state.

II) The most recent (or last) time at which the UE performs the Attach or TAU procedure: The Attach procedure may include all types of Attach procedures (e.g., initial, handover, etc.). The TAU procedure may include all types of TAU procedures (e.g., periodic, mobility, etc.).

III) The most recent (or last) time at which the UE switches from the ECM-CONNECTED state to the ECM-IDLE state: This may be interpreted to as the time at which the UE was most recently in the ECM-CONNECTED state.

IV) The most recent (or last) time at which the UE moves the PDU session from the 5GC to the EPC: Moving the PDU session from the 5GC to the EPC may mean using the PDU session, which was created in the 5GC, as the PDN connection in the EPC. In addition, it may mean that the PDN connection/PDU session has the same APN/DNN. The switching between the PDN connection and the PDU session may be interpreted as a handover operation.

Information II), III), and IV) may be provided only when the UE is in the ECM-CONNECTED state. Alternatively, information II), III), and IV) may be always provided regardless of the ECM state. In addition to information I) to IV), various information may also be provided.

Figure 11:
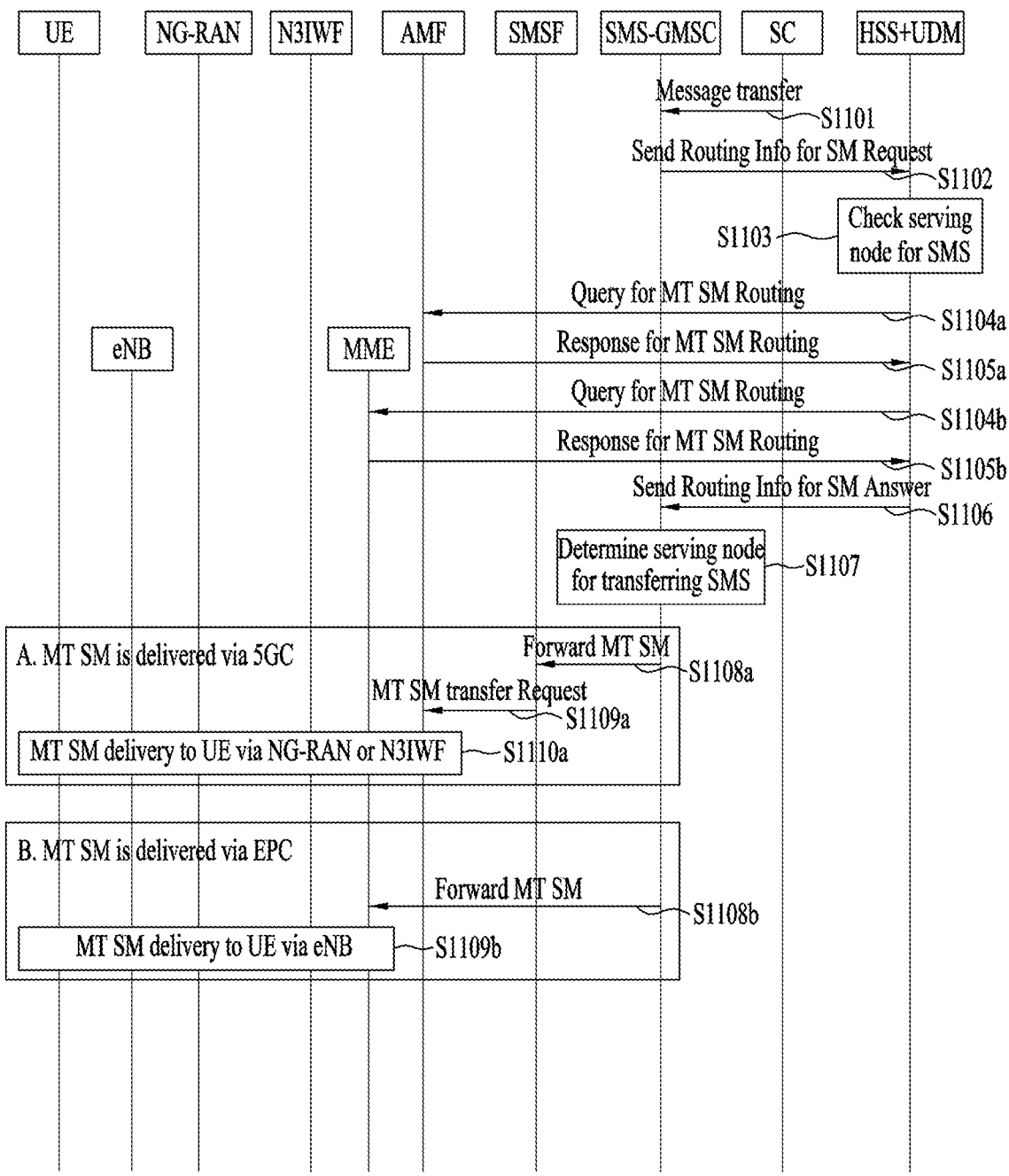
FIGS. 11 and 12 are diagrams for explaining embodiments of the present disclosure.

FIG. 11 illustrates how each network node performs signaling regarding Embodiment 1. Referring to FIG. 11, upon receiving an SMS towards a UE, an SC forwards the SMS to an SMS-GMSC in step S1101. Thereafter, to obtain routing information containing the next destination of the SMS, the SMS-GMSC transmits a message requesting the routing information to an HSS+UDM in step S1102.

In step S1103, the HSS+UDM checks a serving node supporting the SMS for the UE. If there is one serving node supporting the SMS for the UE (either an MME or an SMSF), the HSS+UDM provides information on the corresponding serving node to the SMS-GMSC in step S1106. If both the SMSF and MME acts as the serving node supporting the SMS for the UE, steps S1104 and S1105 are performed.

In step S1104, the HSS+UDM requests information for MT SM routing to an AMF and the MME (in steps S1104a and S1104b). In this case, the AMF is an AMF serving the UE in the same PLMN as the registered SMSF. That is, the AMF serves the UE in terms of MM (if a UE is registered while informing that the UE supports the SMS, such an AMF may inform that the AMF supports the SMS when registering to UDM that the AMF is a serving node). The routing information request may be transmitted as follows: A) the HSS+UDM may request the AMF to send the information for the MT SM routing; and B) the HSS+UDM may send the request to the SMSF, and the SMSF may forward the request to the AMF (in this case, the AMF may transmit a response to the SMSF, and then the SMSF may forward the response to the HSS+UDM).

In step S1105a, the AMF may provide a response including at least one of information i) to iv) described above (e.g., a response for the MT SM routing) to the HSS+UDM.

In step S1105b, the MME may provide a response including at least one of information I) to IV) described above (e.g., a response for the MT SM routing) to the HSS+UDM.

In step S1106, the HSS+UDM provides a response for the routing information to the SMS-GMSC. In this case, if both the SMSF and MME act as the serving node, the HSS+UDM may provide information about both the SMSF and MME together with information about priority (or precedence) therebetween. The priority information may be configured/determined based on the information provided by the AMF (received in step S1105a) and the information provided by the MME (received in step S1105b). In this case, service provider policies, local policies, etc. may also be used (considered).

When there are two serving nodes (or multiple serving nodes including the SMSF and MME), the HSS+UDM may assume one of the above first to third cases, which relate to whether the UE is connected to the 5GC or EPC. When the UE is connected to both the 5GC and EPC or not, if the same priority is given or no priority information is provided, the HSS+UDM may provide at least one of the information provided by the AMF and MME (at least one of information ii), iii), iv), II), III), and IV)) to the SMS-GMSC. When providing the information about the SMSF, the HSS+UDM may also provide information on the access type (e.g., either or both the 3GPP and non-3GPP accesses).

In step S1107, the SMS-GMSC may select/determine a serving node for MT SMS transmission based on the response from the HSS+UDM. When there is one serving node (either the SMSF or MIME), the SMS-GMSC may select the corresponding node for the MT SMS transmission.

When there are two (or multiple) serving nodes, the SMS-GMSC may select a serving node with the highest priority for the MT SMS transmission. The serving node with the highest priority may mean a serving node to which the transmission is first attempted. If the first transmission attempt fails, the SMS-GMSC may attempt the MT SMS transmission to a serving node with the second highest priority.

When there are two (or multiple) serving nodes, if the same priority is given or there is no priority information, the SMS-GMSC may select one of the serving nodes for the MT SMS transmission. In this case, the SMS-GMSC may use not only the service provider policies and/or local policies/configurations but also various information provided by the HSS+UDM. Alternatively, the SMS-GMSC may always select the SMSF first or the MME first.

The SMS-GMSC may request the selected/determined serving node to perform the MT SMS transmission (sends an MT SMS transfer request) in the remaining steps.

When the SMSF is selected for the MT SMS transmission, steps S1108a to S1110a are performed. Details thereof may be found in TS 23.502.

When the MME is selected for the MT SMS transmission, steps S1108b to S1109b are performed. Upon receiving the MT SMS, the MME may transmit the MT SMS to the UE in a NAS message if the UE is in the connected state. If the UE is in the idle state, the MME may page the UE. When the UE responds, the MME may transmit the MT SMS to the UE in a NAS message. Details may be found in the 3GPP specifications.

Embodiment 2

In Embodiment 2, a UE is registered in both the EPS and 5GS. In particular, the UE is registered in the 5GS over both 3GPP and non-3GPP accesses which belong to different PLMNs (the 3GPP access and a non-3GPP interworking function (N3IWF) belong to different PLMNs). Hereinafter, Embodiment 2 will be described with reference to FIG. 12.

Figure 12:
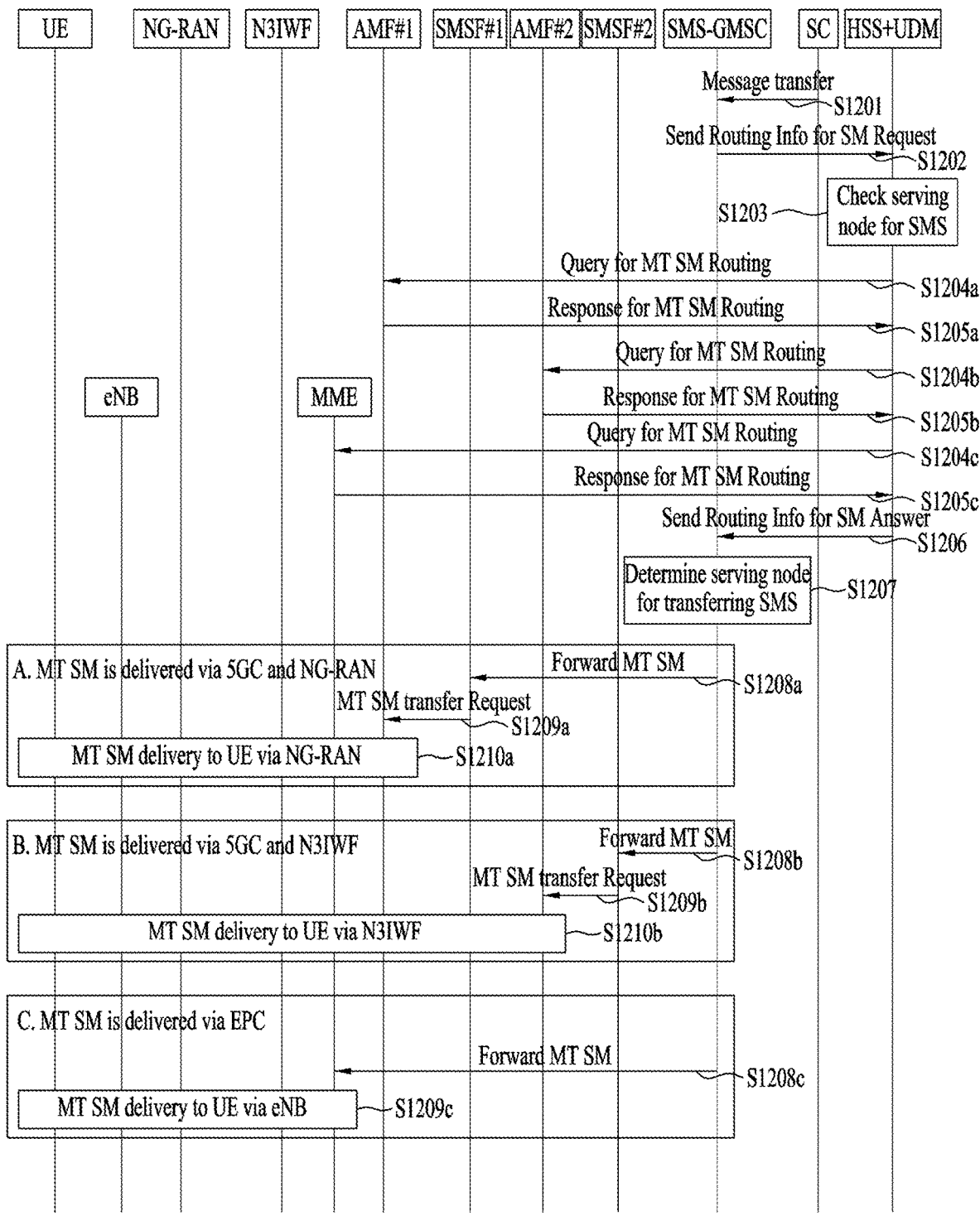

In Embodiment 2, an AMF and an SMSF that serve the 3GPP access and an AMF and an SMSF that serve the non-3GPP access belong to different PLMNs. In FIG. 12, AMF #1 and SMSF #1 serve the 3GPP access and AMF #2 and SMSF #2 serve the non-3GPP access.

Referring to FIG. 12, upon receiving an SMS towards a UE, an SC forwards the SMS to an SMS-GMSC in step S1201. Thereafter, to obtain routing information containing the next destination of the SMS, the SMS-GMSC transmits a message requesting the routing information to an HSS+UDM in step S1202.

In step S1203, the HSS+UDM checks a serving node supporting the SMS for the UE. If there is one serving node supporting the SMS for the UE (either an MME or an SMSF), the HSS+UDM provides information on the corresponding serving node to the SMS-GMSC in step S1206. If there are multiple serving nodes (including SMSF #1, SMSF #2, and the MME), steps S1204 and S1205 are performed.

In step S1204, the HSS+UDM requests information for MT SM routing to the AMF and the MME in steps S1204a, S1204b, and S1204c. Other operations are the same as described in step S1104 of Embodiment 1.

In step S1205a, AMF #1 performs the operations described in step S1105a of Embodiment 1. Since AMF #1 serves only the 3GPP access for the UE, the operation of AMF #1 needs to be considered based thereon. Since the HSS+UDM is capable of obtaining access type information when AMF #1 and/or SMSF #1 is registered, the HSS+UDM may recognize that information provided by AMF #1 relates to the 3GPP access even if AMF #1 provides no access information.

In step S1205b, AMF #2 performs the operations described in step S1105a of Embodiment 1. Since AMF #2 serves only the non-3GPP access for the UE, the operation of AMF #2 needs to be considered based thereon. Since the HSS+UDM is capable of obtaining access type information when AMF #2 and/or SMSF #2 is registered, the HSS+UDM may recognize that information provided by AMF #2 relates to the non-3GPP access even if AMF #2 provides no access information.

In step S1205c, the MME performs the operations described in step S1105b of Embodiment 1.

In step S1206, the HSS+UDM provides a response for the routing information to the SMS-GMSC. In this case, if both the SMSF and MME act as the serving node, the HSS+UDM may provide information about both the SMSF and MME together with information about priority (or precedence) therebetween. The priority information may be configured based on the information provided by AMF #1 (received in step S1205a), the information provided by AMF #2 (received in step S1205b), and the information provided by the MME (received in step S1205c). In this case, service provider policies, local policies, etc. may also be used.

When both the SMSF and MME act as the serving node, the HSS+UDM may perform one of the following operations.

1) When the UE has one of the following connections: a connection with the 5GS over the 3GPP access, a connection with the 5GS over the non-3GPP access, and a connection with the EPC, the HSS+UDM may give the highest priority to a serving node at the connected side. For example, if the UE is connected to the 5GS over the 3GPP access, the highest priority is given to SMSF #1.

The HSS+UDM may give the same priority to the two remaining serving nodes, that is, serving nodes at the non-connected (or idle) sides or give a higher priority to one of the two remaining serving nodes. The priority may be determined based on various information as described above.

2) When the UE is connected to both the 5GC (over both the 3GPP and non-3GPP accesses) and the EPC, the HSS+UDM may give the same priority or provide no priority information (in this case, the SMS-GMSC selects one of SMSF #1, SMSF #2, and the MME and determines to transmit the MT SMS thereto). However, in this case, the HSS+UDM may give the highest priority to one serving node based on information ii), iii), and iv) provided by AMF #1 and AMF #2 (if provided), information II), III), and IV) provided by the MME (if provided), and the local policies/configurations. Alternatively, the highest priority may be given to the SMSF at all times, or it may be given to the MME at all times. When the highest priority is given to the SMSF, an SMSF over the 3GPP access may be prioritized over an SMSF over the non-3GPP access and vice versa.

3) When the UE is not connected to both the 5GC (over both the 3GPP and non-3GPP accesses) and the EPC (or when the UE is idle in both the 5GC and EPC), the HSS+UDM may give the same priority or provide no priority information (in this case, the SMS-GMSC selects one of SMSF #1, SMSF #2, and the MME and determines to transmit the MT SMS thereto). However, in this case, the HSS+UDM may give the highest priority to one serving node based on information ii), iii), and iv) provided by AMF #1 and AMF #2 (if provided), information II), III), and IV) provided by MME (if provided), and the local policies/configurations. For example, when the most recent (or last) time at which the UE moves a PDU session from the 5GC to the EPC is later (more recent) than the most recent (or last) time at which the UE moves a PDN connection from the EPC to the 5GC, the highest priority may be given to the MME (it is based on the assumption that when a UE is discovered by paging, the UE is more likely to receive a response from the EPC than from the 5GC). Alternatively, the highest priority may be given to the SMSF at all times, or it may be given to the MME at all times. When the highest priority is given to the SMSF, an SMSF over the 3GPP access may be prioritized over an SMSF over the non-3GPP access and vice versa.

4) When the UE is connected to a CN over one or two accesses, each of which is related to a serving node, as follows, the HSS+UDM may give a high priority to serving nodes at the connected side than a serving node at the non-connected (or idle) side.

When the UE is connected to the 5GS over both the 3GPP access and non-3GPP access When the UE is connected to the 5GS over the 3GPP access but not connected to the EPC (in the idle state)

When the UE is connected to the 5GS over the non-3GPP access but not connected to the EPC (in the idle state)

The two serving nodes at the connected side may have the same priority, or one of the two serving nodes may have a higher priority. The priority may be determined based on various information, for example, information provided by the AMF and MME, information possessed by the HSS+UDM, etc.

In case 2), 3), and/or 4), if the same priority is given to multiple serving nodes or no priority information is provided, the HSS+UDM may provide at least one of the information provided by the AMF and MME (information ii), iii), iv), II), III), and IV)) to the SMS-GMSC.

When providing the information about the SMSF, the HSS+UDM may also provide information on the access type (e.g., either or both the 3GPP and non-3GPP accesses).

In step S1207, the SMS-GMSC may select/determine a serving node for the MT SMS transmission based on the response from the HSS+UDM. When there is one serving node (either the SMSF or MME), the SMS-GMSC may select the corresponding node for the MT SMS transmission.

When there are three (or multiple) serving nodes, the SMS-GMSC may select a serving node with the highest priority for the MT SMS transmission. The serving node with the highest priority may mean a serving node to which the transmission is first attempted. If the first transmission attempt fails, the SMS-GMSC may attempt the MT SMS transmission to a serving node with the second highest priority. If the second transmission attempt fails, the SMS-GMSC may attempt the MT SMS transmission to a serving node with the next highest priority.

When there are three (or multiple) serving nodes, if the same priority is given or there is no priority information, the SMS-GMSC may select one of the serving nodes for the MT SMS transmission. In this case, the SMS-GMSC may use not only the service provider policies and/or local policies/configurations but also various information provided by the HSS+UDM. Alternatively, the SMS-GMSC may always select the SMSF first or the MME first. When selecting the SMSF (first), the SMS-GMSC may always select an SMSF over the 3GPP access or always select an SMSF over the non-3GPP access.

The SMS-GMSC may request the selected/determined serving node to perform the MT SMS transmission in the remaining steps.

When SMSF #1 is selected for the MT SMS transmission, steps S1208a to S1210a are performed. Details thereof may be found in TS 23.502.

When SMSF #2 is selected for the MT SMS transmission, steps S1208b to S1210b are performed. Details thereof may be found in TS 23.502.

When the MME is selected for the MT SMS transmission, steps S1208c to S1209c are performed. Upon receiving the MT SMS, the MME may transmit the MT SMS to the UE in a NAS message if the UE is in the connected state. If the UE is in the idle state, the MME may page the UE. When the UE responds, the MME may transmit the MT SMS to the UE in a NAS message. Details may be found in the 3GPP specifications.

Meanwhile, a UE may be registered in the 5GS over both a 3GPP access and a non-3GPP access which belong to different PLMNs (the 3GPP access and an N3IWF belong to different PLMNs). The operations in Embodiment 2 may be applied to such a scenario. In other words, the operations may be applied by regarding the presence of SMSF #1 and SMSF #2 except the MME among the serving nodes in Embodiment 2.

In this case, an HSS+UDM may skip a procedure for sending a request for information for MT SM routing to a serving node (i.e., steps 1204a and 1204b). The HSS+UDM may operate as follows: aa) the HSS+UDM may give a higher priority to an SMSF over the 3GPP access and provide related information to an SMS-GMSC; bb) the HSS+UDM may give the higher priority to an SMSF over the non-3GPP access and provide related information to the SMS-GMSC; cc) the HSS+UDM may give the same priority to both the SMSF over the 3GPP access and the SMSF over the non-3GPP access and provide related information to the SMS-GMSC; or dd) the HSS+UDM may assign no priority.

In cases cc) and dd), the SMS-GMSC may select an SMSF to which MT SMS transmission is first attempted. In this case, the SMS-GMSC may select the SMSF based on information provided by the HSS+UDM (in particular, access type information), service provider policies, local polices/configurations, etc. For example, the SMS-GMSC may select the SMSF over the 3GPP access to attempt the MT SMS transmission first to. The reason for why the SMSF over the 3GPP access is selected first is that in the case of the 3GPP access, it is capable of discovering the UE by paging even though the UE is in the CM-IDLE state, unlike the non-3GPP access where paging is disabled when the UE is in the CM-IDLE state. This may be a reason why the serving node over the 3GPP access is prioritized than the serving node over the non-3GPP access or the serving node over the 3GPP access is selected first rather than the serving node over the non-3GPP access.

In Embodiments 1 and 2, when both the MME and SMSF acts as the serving node for the SMS, the HSS+UDM may provide information about both the MME and SMSF to the SMS-GMSC. However, the HSS+UDM may provide information about a serving node with the highest priority or a serving node to which the SMS-GMSC attempts the MT SMS transmission first. Additionally, the HSS+UDM may provide an indicator for allowing the SMS-GMSC to send the routing information request again to the HSS+UDM when the MT SMS transmission fails.

In the above embodiments, it is assumed that the SMS-GMSC attempts to transmit (or retransmit) the SMS based on the routing information obtained from the HSS+UDM. However, in case another entity (e.g., an SMS router, an Internet protocol short message gateway (IP-SM-GW), an SMS gateway (SMS-GW), etc.) rather than the SMS-GMSC obtains the routing information from the HSS+UDM and attempts the SMS (re) transmission, the present disclosure may be applied by replacing the SMS-GMSC with the corresponding entity.

The information about the serving node provided by the HSS+UDM to the SMS-GMSC may include information for identifying the serving node. Identification information on the MME may follow the legacy information format. Details thereof may be found in TS 29.173. In the case of identification information on the SMSF, information similar to the MME identification information may be provided.

While the present disclosure is described on the assumption that the MME supports the SMS function in the case of the SMS in the EPC, the present disclosure is not limited thereto. For example, the present disclosure is applicable to SMS over SGs. In the both cases, the UE transmits and receives the SMS using a NAS message via the MME. Details of the SMS may be found in TS 23.040, TS 29.338, TS 29.002, etc.

Figure 13:
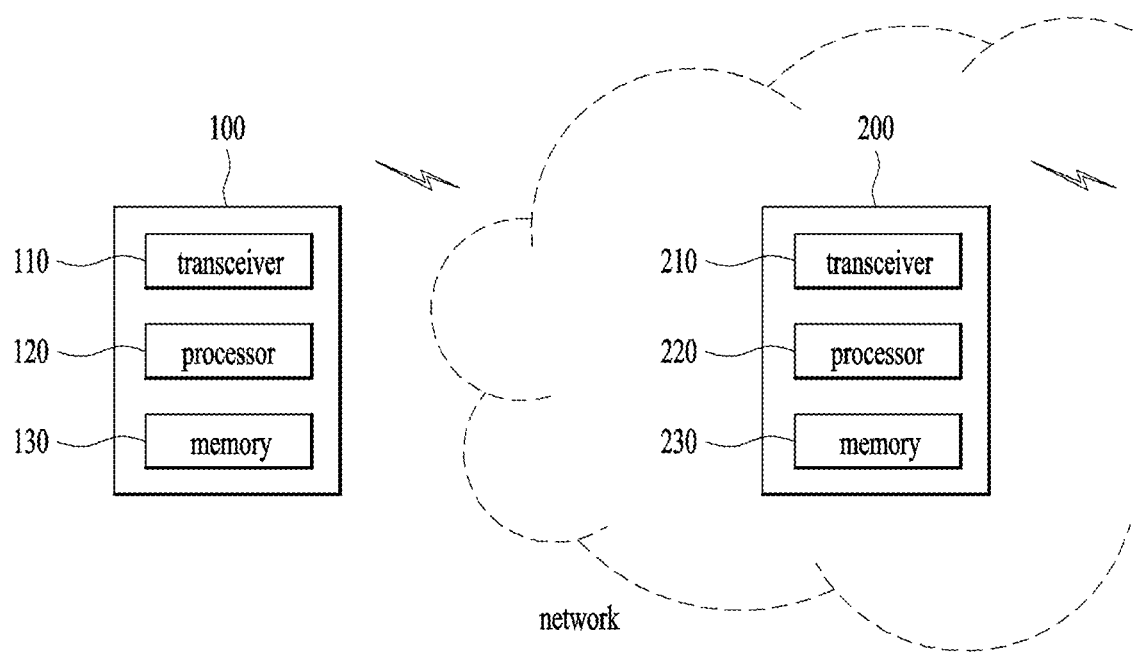
FIG. 13 is a diagram illustrating the configurations of node devices according to embodiments of the present disclosure.

FIG. 13 illustrates the configurations of a UE device and a network node device according to embodiments of the present disclosure.

Referring to FIG. 13, the UE device 100 according to the present disclosure may include a transceiver 110, a processor 120, and a memory 130. The transceiver 110 may be configured to transmit and receive various signals, data, and information to and from an external device. The UE device 100 may be connected to the external device by wire and/or wirelessly. The processor 120 may be configured to control the overall operations of the UE device 100 and process information exchanged between the UE device 100 and the external device. The memory 130 may be configured to store the processed information for a predetermined time and replaced with a component such as a buffer (not shown in the drawing). In addition, the processor 120 may be configured to perform the UE operations proposed in the present disclosure.

Continuing to refer to FIG. 13, the network node device 200 may include a transceiver 210, a processor 220, and a memory 230. The transceiver 210 may be configured to transmit and receive various signals, data, and information to and from an external device. The network node device 200 may be connected to the external device by wire and/or wirelessly. The processor 220 may be configured to control the overall operations of the network node device 200 and process information exchanged between the network node device 200 and external device. The memory 230 may be configured to store the processed information for a predetermined time and replaced with a component such as a buffer (not shown in the drawing). In addition, the processor 220 may be configured to perform the network node operations proposed in the present disclosure. Specifically, the processor 220 may be configured to control an HSS+UDM to receive information for MT SM routing from an AMF and an MME, determine priorities on whether to transmit an MT SM first to an SMSF connected to the AMF or the MME based on the information, and transmit routing information including the determined priorities to an SMS-related node. In this case, the HSS+UDM may determine the priorities depending on whether the UE receiving the MT SM is connected to the 5GC or the EPC.

Regarding the configurations of the UE device 100 and the network device 200, the above-described various embodiments of the present disclosure may be applied independently, or two or more embodiments of the present disclosure may be applied at the same time. Redundant description has been omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method of supporting, by a home subscriber server+user data management (HSS+UDM), a mobile terminated (MT) short message (SM) service for a user equipment (UE) registered in both an evolved packet core (EPC) and a fifth-generation (5G) core network (5GC) in a wireless communication system, the method comprising:
receiving, by the HSS+UDM, information for MT SM routing from an access and mobility management function (AMF) and a mobility management entity (MME);
determining priorities on whether to transmit an MT SM first to a short message service function (SMSF) connected to the AMF or the MME based on the information; and
transmitting routing information including the determined priorities to a short message service related (SMS-related) node,
wherein the HSS+UDM determines the priorities depending on whether the UE receiving the MT SM is connected to the 5GC or the EPC.

2. The method of claim 1, wherein based on the UE connected to either the 5GC or the EPC, the HSS+UDM assigns a higher priority to a serving node in the connected core network.

3. The method of claim 1, wherein based on the UE connected to both the 5GC and the EPC, the HSS+UDM assigns equal priorities to the SMSF and the MME.

4. The method of claim 3, wherein based on the equal priorities of the SMSF and the MME, the determination of whether the MT SM is routed to the SMSF or the MME is left to an SMS gateway mobile switching center (SMS-GMSC).

5. The method of claim 1, wherein based on the UE connected to neither the 5GC nor the EPC, the HSS+UDM determines the priorities by comparing a most recent time at which the UE moves a packet data network (PDN) connection to the 5GC and a most recent time at which the UE moves a protocol data unit (PDU) session from the 5GC to the EPC.

6. The method of claim 5, wherein based on the most recent time at which the UE moves the PDU session from the 5GC to the EPC later than the most recent time at which the UE moves the PDN connection from the EPC to the 5GC, the HSS+UDM assigns a higher priority to the MME.

7. The method of claim 1, wherein the information for the MT SM routing received from the AMF includes at least one of the following information: whether the UE is in a connection management connected (CM-CONNECTED) state; a most recent time at which the UE performs a registration; a most recent time at which the UE enters a CM-IDLE state; or a most recent time at which the UE moves a packet data network (PDN) connection from the EPC to the 5GC.

8. The method of claim 1, wherein the information for the MT SM routing received from the MME includes at least one of the following information: whether the UE is in an evolved packet system (EPS) connection management connected (ECM-CONNECTED) state; a most recent time at which the UE performs an Attach procedure or a tracking area update (TAU) procedure; a most recent time at which the UE enters an ECM-IDLE state; or a most recent time at which the UE moves a protocol data unit (PDU) session from the 5GC to the EPC.

9. The method of claim 1, wherein each of the SMSF connected to the AMF and the MME corresponds to a serving node supporting the SMS for the UE.

10. The method of claim 1, wherein the SMS-related node is one of an SMS gateway mobile switching center (SMS-GMSC), an SMS router, an Internet protocol short message gateway (IP-SM-GW), and an SMS gateway (SMS-GW).

11. The method of claim 1, wherein based on a most recent time at which the UE performs an Attach procedure or a tracking area update (TAU) procedure later than a most recent time at which the UE performs a 5GC registration, the MME is determined to have a higher priority.

12. The method of claim 1, wherein based on a most recent time at which the UE enters an evolved packet system (EPS) connection management idle (ECM-IDLE) state later than a most recent time at which the UE enters a connection management idle (CM-IDLE) state, the MME is determined to have a higher priority.

13. A home subscriber server+user data management (HSS+UDM) device for supporting a mobile terminated (MT) short message (SM) service for a user equipment (UE) registered in both an evolved packet core (EPC) and a fifth-generation (5G) core network (5GC) in a wireless communication system, the HSS+UDM device comprising:
a transceiver; and
a processor,
wherein the processor is configured to: control the HSS+UDM device to receive information for MT SM routing from an access and mobility management function (AMF) and a mobility management entity (MME); determine priorities on whether to transmit an MT SM first to a short message service function (SMSF) connected to the AMF or the MME based on the information; and transmit routing information including the determined priorities to a short message service related (SMS-related) node, and wherein the HSS+UDM device determines the priorities depending on whether the UE receiving the MT SM is connected to the 5GC or the EPC.

* * * * *